United States Patent
Chizuwa et al.

(10) Patent No.: US 8,043,423 B2
(45) Date of Patent: Oct. 25, 2011

(54) PIGMENT DISPERSION LIQUID, INK JET RECORDING INK, INK JET RECORDING METHOD, INK CARTRIDGE AND INK JET RECORDING APPARATUS

(75) Inventors: Junko Chizuwa, Fukui (JP); Tomoya Yamamoto, Awara (JP); Takayuki Ookawa, Fukui (JP); Suzuka Ueno, Fukui (JP)

(73) Assignee: Canon Finetech Inc., Misato-shi (JP)

( * ) Notice: Subject to any disclaimer, the term of this patent is extended or adjusted under 35 U.S.C. 154(b) by 499 days.

(21) Appl. No.: 12/335,992

(22) Filed: Dec. 16, 2008

(65) Prior Publication Data
US 2009/0162552 A1    Jun. 25, 2009

(30) Foreign Application Priority Data
Dec. 25, 2007 (JP) ................. 2007-331402

(51) Int. Cl.
*C09D 11/00* (2006.01)
(52) U.S. Cl. .......... 106/31.13; 427/256; 526/303.1; 526/304; 106/31.6; 106/31.85; 106/31.89
(58) Field of Classification Search ........... 427/256
See application file for complete search history.

(56) References Cited

U.S. PATENT DOCUMENTS

| | | | |
|---|---|---|---|
| 4,639,491 A * | 1/1987 | Kondo et al. | 524/801 |
| 5,082,496 A | 1/1992 | Yamamoto et al. | |
| 5,085,698 A | 2/1992 | Ma et al. | |
| 5,127,946 A | 7/1992 | Eida et al. | |
| 5,178,671 A | 1/1993 | Yamamoto et al. | |
| 5,221,334 A | 6/1993 | Ma et al. | |
| 5,258,505 A | 11/1993 | Eida et al. | |
| 5,272,201 A | 12/1993 | Ma et al. | |
| 5,540,764 A | 7/1996 | Haruta et al. | |
| 6,426,766 B1 | 7/2002 | Shirota et al. | |
| 7,446,135 B2 | 11/2008 | Ham et al. | |
| 2006/0281853 A1 | 12/2006 | Yamagishi et al. | |
| 2010/0021635 A1 * | 1/2010 | Ookawa et al. | 427/256 |

FOREIGN PATENT DOCUMENTS

| | | |
|---|---|---|
| JP | 4-227668 | 8/1992 |
| JP | 5-179183 | 7/1993 |
| JP | 2005-177756 | 7/2005 |
| JP | 2006-282760 | 10/2006 |

* cited by examiner

*Primary Examiner* — Marc Zimmer
*Assistant Examiner* — Lindsay Nelson
(74) *Attorney, Agent, or Firm* — Fitzpatrick, Cella, Harper & Scinto (57) ABSTRACT

A pigment dispersion liquid capable of stably recording images having high fastness and excellent quality for a long term in any cases has been provided. A pigment dispersion liquid mainly containing a polymer dispersant, a pigment and water, wherein the polymer dispersant is a copolymer comprised of at least a hydrophobic unit and a hydrophilic unit, the hydrophobic unit has a block portion comprised of at least one hydrophobic monomer, the hydrophilic unit has at least a repeating unit structure of an acrylamide structure of the following general formula (1), and the segment number (A) of the block portion comprised of a hydrophobic monomer to the number (B) of all segments of the polymer dispersant is in a range of 0.07 to 0.85 in terms of A/B ratio.

11 Claims, 3 Drawing Sheets

PIGMENT DISPERSION LIQUID, INK JET RECORDING INK, INK JET RECORDING METHOD, INK CARTRIDGE AND INK JET RECORDING APPARATUS

BACKGROUND OF THE INVENTION

1. Field of the Invention

The present invention relates to a pigment dispersion liquid, an ink jet recording ink (hereinbelow which may be referred to simply as "ink"), an ink jet recording method, an ink cartridge and an ink jet recording apparatus. More particularly, the present invention relates to a pigment dispersion liquid of the coloring material dispersion type and an aqueous ink jet recording ink which have high storage stability, good fixation of printed images as well as fastness of recorded images and are suitable for ink jet recording, and to an ink jet recording method, an ink cartridge and an ink jet recording apparatus using the ink.

2. Description of the Related Art

Conventionally, water-insoluble coloring materials such as pigments excellent in fastness such as water fastness and light fastness have been widely used as a coloring agent for a printing ink. However, in order to use a water-insoluble coloring material as a coloring material for an aqueous ink, it is required to stably disperse the water-insoluble coloring material in an aqueous medium. Owing to this, aqueous inks of the coloring material dispersion type in which a water-insoluble coloring material is uniformly dispersed in an aqueous medium by adding a dispersant such as a polymer compound or a surfactant have been used.

In recent years, in applications to ink jet recording as well, such aqueous ink jet recording inks of the coloring material dispersion type have come to be used as inks in view of image fastness. Attempts to impart an aggregation function and a water insolubilization function to coloring material particles in the ink have been made in respect of ink jet recording in order to improve fixation of recorded images and water fastness of ink on paper. However, when the coloring material particles are provided with these functions, dispersion stability of the coloring material particles in the ink is deteriorated, the coloring material particles will aggregate during storage of the ink, which causes such problems that concentration unevenness and sedimentation are liable to occur, that drying of the ink at the tip of a nozzle of an ink jet apparatus causes clogging and thereby ejection stability of the ink is liable to deteriorate.

In order to solve the problems mentioned above, Japanese Patent Application Laid-Open No. H04-227668, Japanese Patent Application Laid-Open No. H05-179183 and Japanese Patent Application Laid-Open No. 2005-177756 propose block polymers having a particular acrylic monomer structure in a hydrophilic segment thereof, but affinity of the hydrophilic monomer structure region, which constitutes the polymer, to recording materials is insufficient in these polymers, and accordingly, when these polymers are used in ink, image fastness such as ink fixation and scratch resistance is not at a sufficiently satisfactory level. Furthermore, in uses for which long-term continuous printing is required in industrial applications, an ink containing a block polymer mentioned above has such a problem to be solved that the ejection stability of the ink is significantly deteriorated.

In the meantime, Japanese Patent Application Laid-Open No. 2006-282760 proposes an ink containing a polymer dispersant and an urethane resin, but this ink has such a problem that dispersion stability of the coloring material particles at the time of a long term storage or a storage at a high temperature is significantly deteriorated, and besides, ejection stability of the ink is significantly deteriorated in uses for which long-term continuous printing is required in industrial applications. In addition, when such an ink is used in an ink jet recording apparatus which causes the ink to fly by thermal energy, such a problem is caused that the coloring material particles severely aggregate to make it impossible to eject the ink.

SUMMARY OF THE INVENTION

The present invention has been made in consideration of the problems mentioned above, and an object thereof is to provide a pigment dispersion liquid which is able to stably record images having high fastness such as high fixation and high scratch resistance and excellent quality for a long term in any cases and besides to provide an ink jet recording ink and an ink jet recording method which are able to record images having excellent fastness and quality as well as an ink cartridge and an ink jet recording apparatus containing or using such an ink.

The present inventors have conducted intensive studies so as to solve the problem mentioned above, and consequently have found that the problem mentioned above can be solved by the present invention described below.

That is, the present invention provides a pigment dispersion liquid mainly comprising a polymer dispersant, a pigment and water, wherein the polymer dispersant is a copolymer comprised of at least a hydrophobic unit and a hydrophilic unit, the hydrophobic unit has a block portion comprised of at least one hydrophobic monomer, the hydrophilic unit has at least a repeating unit structure of an acrylamide structure of the following general formula (1), and wherein the segment number (A) (number of monomer units) of the block portion comprised of a hydrophobic monomer to the number (B) of all segments (number of monomer units) of the polymer dispersant is in a range of 0.07 to 0.85 in terms of A/B ratio:

General formula (1)

wherein, $R^1$ represents a hydrogen atom or a methyl group, X represents a hydrogen atom or an alkyl group having 1 to 4 carbon atoms and n is 1 to 10.

In the pigment dispersion liquid of the present invention, it is preferable that the block portion comprised of a hydrophobic monomer in the hydrophobic unit is a block portion comprised of a repeating unit structure of the following general formula (2)

General formula (2)

wherein, $R^2$ represents a hydrogen atom or a methyl group and Y represents —$R^3$, —$OR^3$ or —$COOR^3$ where $R^3$ represents an alkyl group having 1 to 18 carbon atoms; the hydrophilic unit has a segment having an anionic hydrophilic group; the hydrophilic unit has a block portion comprised of a repeating unit structure of the general formula (1) and a block portion comprised of a segment having an anionic hydrophilic group; the polymer dispersant is comprised of at least a block portion comprised of a repeating unit structure of the general formula (2), a block portion comprised of a repeating unit structure of the general formula (1) and a block portion comprising a segment having an anionic hydrophilic group in the stated order; and the segment number (A) of the block portion comprised of a hydrophobic monomer of the polymer dispersant to the segment number(C) of the general formula (1) of the polymer dispersant is in a range of 0.1 to 20 in terms of A/C ratio.

The present invention also provides an ink jet recording ink formed by mixing a pigment dispersion liquid mentioned above and at least a water-soluble organic solvent.

In addition, the present invention provides an ink jet recording method including causing an ink to fly by applying energy to the ink to apply the ink to a recording material, wherein the ink is an ink of the present invention mentioned above. In the recording method, the energy is preferably a thermal energy.

Furthermore, the present invention provides an ink cartridge having an ink storage portion containing an ink, wherein the ink is an ink jet recording ink of the present invention mentioned above. Besides, the present invention provides an ink jet recording apparatus having an ink cartridge having an ink storage portion containing an ink and a head portion for ejecting the ink, wherein the ink is an ink of the present invention mentioned above.

According to the present invention mentioned above, a pigment dispersion liquid which is able to stably record images having high fastness and excellent quality for a long term in any cases can be provided, and further an ink, an ink jet recording method, an ink cartridge and an ink jet recording apparatus which is able to record images having high fastness and excellent quality can be provided.

Further features of the present invention will become apparent from the following description of exemplary embodiments with reference to the attached drawings.

DESCRIPTION OF THE EMBODIMENTS

In the following, the present invention is described in detail.

The present inventors have found that a pigment dispersion liquid which is able to stably record images having high fastness and excellent quality in any cases can be provided by using a pigment dispersion liquid mainly comprising a polymer dispersant, a pigment and water, wherein the polymer dispersant is a copolymer comprised of at least a hydrophobic unit and a hydrophilic unit, the hydrophobic unit has a block portion comprised of at least one hydrophobic monomer, the hydrophilic unit has at least a repeating unit structure of an acrylamide structure of the following general formula (1), and wherein the segment number (A) of the block portion comprised of a hydrophobic monomer to the number (B) of all segments of the polymer dispersant is in a range of 0.07 to 0.85 in terms of A/B ratio.

General formula (1)

wherein, $R^1$, X and n mean the same as defined above.

Since the polymer dispersant used in the present invention has a hydrophobic unit having a block portion including hydrophobic monomers which has a good affinity to pigments, the polymer dispersant encapsulates the pigments uniformly and improves the dispersion stability of the encapsulated pigment particles. Besides, it is considered that since the hydrophilic unit of the polymer dispersant has a repeating unit structure of an acrylamide structure including an ethylene oxide structure which has a good affinity to water, the dispersion stability of the encapsulated pigment particles is further improved and long-term storage stability and ejection stability of the ink are improved. In addition, by limiting the ratio of the block portion comprised of at least one hydrophobic monomer in the hydrophobic unit in the polymer dispersant to a specific range, affinity between the polymer dispersant and the pigments and affinity between the polymer dispersant and water are respectively improved to be best and further stable encapsulated pigment particles are formed, and thereby dispersibility of the encapsulated pigment particles which are good in long-term dispersion stability and dispersion stability at an elevated temperature can be maintained.

In addition, since the hydrophilic unit of the polymer dispersant has an ethylene oxide structure having a high affinity to water and a water-soluble organic solvent in the pigment dispersion liquid (ink), it is made possible that the ink does not remain only on the surface of the recording materials and the ink appropriately permeates into the inside of the recording materials to such an extent that image density and bleeding are not deteriorated. Moreover, it is considered that since the hydrophilic unit of the polymer dispersant has an amide structure which has a good affinity to recording materials, close contact between the recorded images and recording material is improved to be best and fastness such as fixation of the ink and scratch resistance of the recorded images is improved.

In addition, since the ratio of the block portion of the hydrophobic unit in the polymer dispersant is controlled to a particular range, more stable encapsulated pigment particles are formed. Owing to this, encapsulated state of the pigment particles is maintained in the images after recording. Since the polymer dispersant firmly covers the pigment particles in this way, it is considered that fastness such as fixation of ink and scratch resistance of recorded images is still more improved than in the case where part of the surface of the pigment particles is exposed. When the hydrophobic unit in the polymer dispersant has a block portion of a particular structure containing an aromatic hydrocarbon group, this effect is further improved.

These effects achieve good image fastness and fixation without deterioration of color development and improve stability of the ink during long term storage. Furthermore, with respect to ink condensation in a nozzle tip which occurs when it is used for an ink jet recording apparatus, the dispersion stability of the encapsulated pigment particles is not deteriorated and stable ejection of the ink is possible. Furthermore, even in the case of an ink jet apparatus having a line head in which cleaning recovery operation of the ink jet nozzle cannot be performed frequently, the present invention is able to suppress adhesion of the encapsulated pigment particles to circumferential area around the nozzle, and therefore, ejection failure and print dot misalignment are hard to occur and good continuous printing performance can be achieved for a long term.

In the following, materials constituting the pigment dispersion liquid of the present invention are described in detail.

(Polymer Dispersant)

The polymer dispersant used in the present invention is a copolymer comprised of at least a hydrophobic unit and a hydrophilic unit, the hydrophobic unit has a block portion comprised of at least one hydrophobic monomer, the hydrophilic unit has at least a repeating unit structure of an acrylamide structure of the following general formula (1), and wherein the segment number (A) of the block portion comprised of a hydrophobic monomer to the number (B) of all segments of the polymer dispersant is in a range of 0.07 to 0.85 in terms of A/B ratio.

General formula (1)

In the general formula (1), $R^1$ represents a hydrogen atom or a methyl group, X represents a hydrogen atom or an alkyl group having 1 to 4 carbon atoms, preferably, a hydrogen atom or a methyl group, and n is in a range of 1 to 10, preferably, in a range of 1 to 6.

The number of the repeating unit of the monomer structure mentioned above is 10 to 200, preferably 20 to 150, more preferably 20 to 100. These conditions are desirable since the dispersion stability of the encapsulated pigment particles and fixation of the ink on recording materials are further improved.

Examples of the monomer used for forming the structure of the general formula (1) include N-(2-hydroxyethyl)acrylamide, N-(2-(2-hydroxyethoxy)ethyl)acrylamide, N-(2-(2-(2-hydroxyethoxy)ethoxy)ethyl)methacrylamide, N-(methoxyethyl)acrylamide, N-(2-(2-ethoxyethoxy)ethyl)acrylamide, N-(2-(2-(2-butoxyethoxy)ethoxy)ethyl)methacrylamide, N-(2-(2-(2-(2-(2-methoxyethoxy)ethoxy)ethoxy)ethoxy)ethyl)methacryl-amide. These can be used either singly or in combination of two or more kinds of them.

As for the hydrophobic unit of the polymer dispersant, it is sufficient that the unit has a block portion including at least one hydrophobic monomer, and those including such hydrophobic monomers in the hydrophilic unit portion can be also used. In addition, when two or more hydrophobic monomers are included, those containing the hydrophobic monomers in a random condition or as a block can be used as long as the hydrophobic blocks include only these hydrophobic monomers. More preferred are those including block portions each of which is comprised of only either one of the hydrophobic monomers since they can desirably form more stable encapsulated pigment particles.

The number of the repeating unit of the hydrophobic monomers of the hydrophobic block portion is, when comprised of two or more hydrophobic monomers, 10 to 200, preferably 20 to 150, more preferably 20 to 100 in terms of the total number of the repeating units of those hydrophobic monomers. These conditions are desirable since the affinity between the polymer dispersant and the pigment become good. In the meantime, when units comprised of hydrophobic monomers other than the hydrophobic block portion are contained, the ratio of the repeating unit (monomer) number in the hydrophobic block portion is 30 mass % or more, preferably 50 mass % or more, and more preferably 70 mass % or more with respect to the total number of all the hydrohobic monomer units in the polymer dispersant. These conditions are desirable since the dispersion stability of the encapsulated pigment particles is further improved.

In the polymer dispersant used in the present invention, the segment number (A) of the hydrophobic block portion to the number (B) of all segments of the polymer dispersant is in a range of 0.07 to 0.85, preferably in a range of 0.15 to 0.75, and more preferably in a range of 0.20 to 0.70 in terms of A/B ratio. When the A/B ratio is smaller than 0.07, the dispersion stability of the encapsulated pigment particles deteriorates. When the ratio is larger than 0.85, ejection properties of the ink and abrasion resistance of the printed images deteriorate. Furthermore, the segment number (A) of the hydrophobic block portion of the polymer dispersant to the segment number (C) of the above general formula (1) of the polymer dispersant is preferably in a range of 0.1 to 20.0, more preferably in a range of 0.2 to 5.0 in terms of A/C ratio. These conditions are desirable since the dispersion stability of the encapsulated pigment particles at an elevated temperature and abrasion resistance of the printed images are further improved.

The segment number (A) denotes the average value of the number of the repeating unit of each monomer of in the polymer dispersant. That is, the segment number of the hydrophobic block portion denotes the average number of the repeating unit of a monomer forming the hydrophobic block portion in the polymer dispersant, and it denotes the number of the repetition in a block portion comprised of the repetition of a single monomer while it denotes the average value of the total of the repetitions of the monomers in a block portion comprised of two or more monomers. The number of all segments of the polymer dispersant denotes the average value of the total of the repetitions of all monomers forming the polymer dispersant, and the number of the monomers of the above general formula (1) denotes the average value of the number of the repetition of the monomer of the acrylamide structure of the above general formula (1) contained in the polymer dispersant.

As a hydrophobic monomer, any monomer copolymerizable with a monomer of the acrylamide structure which constitutes the hydrophilic unit can be used. A vinyl monomer having a hydrophobic substituent group is preferable, and above all a monomer which constitutes the repeating unit structure of the following general formula (2) is desirable since the affinity between the polymer dispersant and the pigments are further improved, and stable encapsulated pigment particles can be formed.

General formula (2)

$R^2$ in the general formula (2) mentioned above is preferably a hydrogen atom or a methyl group, and Y is preferably —$R^3$, —$OR^3$ or —$COOR^3$, wherein $R^3$ is preferably an alkyl group having 1 to 18 carbon atoms. Examples of such monomers include 1-methyl-4-vinylbenzene, 1-ethyl-4-(propen-2-yl)benzene, 1-butyl-4-(propen-2-yl)benzene, 1-dodecyl-4-(propen-2-yl)benzene, 4-methoxy-vinylbenzene, 4-butoxy-vinylbenzene, methyl 4-vinylbenzoate, butyl 4-vinylbenzoate, dodecyl 4-vinylbenzoate, hexadecyl 4-vinylbenzoate, octadecyl 4-vinyl benzoate. These can be used either singly or in combination of two or more kinds of them.

As a hydrophilic unit of the polymer dispersant, a monomer unit having the structure of the above general formula (1) and monomer units having other hydrophobic substituent groups and/or hydrophilic substituent groups can be used in combination. Monomer units having a hydrophilic substituent group are preferable since the dispersion stability of the pigments is further improved. Examples of the monomers having hydrophilic substituent group (include acrylic acid, methacrylic acid, crotonic acid, maleic acid, fumaric acid, styrenesulfonic acid, styrenecarboxylic acid, mono-(2-acryloyloxy-1-methyl-ethyl) phthalate, and among these, acrylic acid, methacrylic acid are desirable in view of polymerizability. These can be used either singly or in combination of two or more kinds of them. Here, it is preferable that the hydrophilic unit includes a block portion comprised of the repeating unit structure of the above general formula (1) and a block portion of the segment having an anionic hydrophilic group, since the fixation of the encapsulated pigment particles on the recording materials becomes further better. In particular, it is preferable that the polymer dispersant is comprised of at least a block portion comprised of a repeating unit structure of the general formula (2), a block portion comprised of a repeating unit structure of the general formula (1) and a block portion comprised of a segment having an anionic hydrophilic group in this order, since the dispersion stability of the encapsulated pigment particles and fixation of the ink on the recording materials are improved to be best.

The polymer dispersant used in the present invention can be obtained by subjecting monomers mentioned above to ordinary polymerization methods such as radical polymerization or anionic polymerization, and particularly, living radical polymerization method is preferably used. Copolymers and block copolymers having a length (molecular weight) precisely adjusted can be prepared by using living radical polymerization methods. It is preferable that these polymer dispersants are preferably in a range of 3,000 to 70,000, and more preferably in a range of 5,000 to 50,000 in terms of the weight average molecular weight. Identification of the resultant polymer dispersant can be performed by qualitative/quantitative analysis of functional groups by NMR and IR and analysis by various chromatography.

When the polymer dispersant has an anionic hydrophilic group, acid value of the polymer dispersant is preferably in a range of 10 to 150 mgKOH/g, more preferably in a range of 30 to 100 mgKOH/g. When the acid value is in this range, both the pigment dispersion stability in the ink and waterfastness/fixation can be obtained at a good level. The anionic hydrophilic group of the polymer dispersant preferably has a neutralization degree of 50 to 100 mol %, more preferably 80 to 100 mol %, since deterioration of ejection properties of the ink is hard to occur. As for a neutralization method of the anionic hydrophilic group, both of a method of neutralizing a vinyl monomer containing an anionic hydrophilic group with an alkali followed by performing polymerization and a method of performing polymerization followed by neutralizing a vinyl monomer containing an anionic hydrophilic group with an alkali can be used but a method of neutralizing later is preferable in consideration of polymerization of monomers. Examples of the alkali used for neutralization include alkali metals such as lithium, sodium and potassium, amines such as ammonia, monoethanolamine and triethanolamine. Potassium is preferable since ejection properties of the ink are further improved. Specific examples thereof include potassium hydroxide, sodium hydroxide, lithium hydroxide, potassium carbonate, sodium carbonate and lithium carbonate. The acid value of the polymer dispersant in the present invention denotes a value measured in accordance with the acid value measurement method described in Japanese Industrial Standards JIS-K0070.

The content of the polymer dispersant in the pigment dispersion liquid of the present invention is preferably in a range of 0.5 to 30 mass %, more preferably in a range of 1.0 to 20 mass % of the total mass of the pigment dispersion liquid. The content in the ink is preferably in a range of 0.1 to 15 mass %, more preferably in a range of 0.5 to 10 mass % of the total mass of the ink.

(Pigment)

Although the kind of the pigment in the pigment dispersion liquid of the present invention is not limited and both of organic pigments and inorganic pigments can be used, black pigments and colored pigments of cyan, magenta and yellow are particularly useful. The content of the pigments is preferably in a range of 0.5 to 30 mass %, more preferably in a range of 1.0 to 20 mass % of the total mass of the pigment dispersion liquid, and the content in the ink is preferably in a range of 0.1 to 15 mass %, more preferably in a range of 0.5 to 10 mass % of the total mass of the ink. When the content of the pigment in the ink less than 0.1 mass %, sufficient image density is hard to be attained in some cases. When the content of the pigment exceeds 15 mass %, ejection stability is deteriorated due to clogging of the ink in the nozzle and so on in some cases. The content ratio of the pigment and the polymer dispersant mentioned above is preferably 10:1 to 1:3, more preferably 5:1 to 1:2 in terms of solid content mass ratio. This range is desirable from the viewpoints of fixation of the ink, fastness of the printed images, ejection stability and storage stability of the ink. In addition to single use, these pigments can be used in combination of two or more kinds.

The average particle size of the encapsulated pigment particles formed from these pigments with the polymer dispersant in the pigment dispersion liquid is preferably 50 nm or more and 200 nm or less, more preferably 50 nm or more and 150 nm or less. When the average particle size of the encapsulated pigment particle is in this range, ejection stability of the ink is further improved, and the color development characteristics of the printed images also become good. As a method to measure the particle size of the encapsulated pigment particles, a laser light scattering method was used.

Water which is a dispersion medium of the pigment dispersion liquid of the present invention is not particularly limited and may be tap water, deionized water, ion-exchange water, pure water and the like, in which deionized water and ion-exchange water are preferable. The amount of water to be used is such that the pigment concentration falls within the above range.

The above are the materials which mainly constitute the pigment dispersion liquid of the present invention, but it is preferable to use a water-soluble organic solvent in addition to these. As a water-soluble organic solvent used in the pigment dispersion liquid of the present invention, any water-soluble organic solvent can be used and two or more water-soluble organic solvents can be used as a mixed solvent.

Specific examples of preferable water-soluble organic solvents include lower alcohols such as methyl alcohol, ethyl alcohol, n-propyl alcohol, isopropanol, n-butyl alcohol, sec-butyl alcohol, tert-butyl alcohol; diols such as ethyleneglycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol, 1,4-cyclohexanediol; triols such as 1,2,4-butanetriol, 1,2,6-hexane triol, 1,2,5-pentane triol; hindered alcohols such as trimethylolpropane, trimethylol ethane, neopentyl glycol, pentaerythritol; glycol ethers such as ethylene glycol monomethylether, ethylene glycol monoethylether, ethyleneglycol monoisopropylether, ethyleneglycol monoallylether, diethylene glycol monomethylether, diethylene glycol monoethylether, diethylene glycol monobutylether, triethylene glycol monomethylether, triethylene glycol monoethylether, propylene glycol monomethylether, dipropylene glycol mnonomethylether; glycerin, dimethylsulfoxide, glycerin monoallylether, polyethylene glycol, N-methyl-2-pyrrolidone, 2-pyrrolidone, γ-butyrolactone, 1,3-dimethyl-2-imidazolidinone, sulfolane, β-dihydroxyethylurea, urea, acetonylacetone, dimethylformamide, dimethylacetamide, methyl ethyl ketone, acetone, diacetone alcohol.

In addition to the above-mentioned ingredients, various additives such as a surfactant, a pH moderator, an antioxidant, a mildewproofing agent may be added to the pigment dispersion liquid of the present invention.

The pigment dispersion liquid of the present invention can be obtained by dispersing a pigment in water using the above polymer dispersant by conventionally well-known pigment dispersion techniques. As a preferable production method, the above polymer dispersant is dissolved preferably in an organic solvent such as methylethyl ketone, acetone, methanol, ethanol and tetrahydrofuran to prepare a solution (concentration: 1 to 30 mass %), and the solution and the above pigment is sufficiently kneaded at the above solid content ratio to disperse the pigment and coat the pigment particles with the polymer dispersant, and then the solvent is evaporated.

The obtained mixture is made into a shape such as a flake, a sheet and a powder, and an appropriate amount of water containing an appropriate amount of an alkali substance is added to this, and thereby the pigment dispersion liquid of the present invention is obtained.

The ink jet recording ink of the present invention can be obtained by mixing the pigment dispersion liquid mentioned above with at least a water-soluble organic solvent. Those listed above for the pigment dispersion liquid can be preferably used as a water-soluble organic solvent used in ink jet recording ink of the present invention. Among these, a water-soluble organic solvent having a boiling point of 120° C. or more is preferable since when such a water-soluble organic solvent is used, condensation of the ink in a nozzle tip is suppressed. The proportion of the water-soluble organic solvent in the ink is preferably 5 to 50 mass %, more preferably 10 to 30 mass % of the total mass of the ink.

In addition, various additives such as water and a surfactant, a pH regulator, an antioxidant, a mildewproofing agent may be added as needed when the pigment dispersion liquid and the water-soluble organic solvent are mixed.

Furthermore, pH of the ink is adjusted preferably to a range of 8.0 to 10.0, more preferably to a range of 8.4 to 9.8, since the long-term storage stability of the ink is improved and deterioration of the ejection properties of the ink after storing for a long term is suppressed. Examples of the pH regulator include organic amines such as triethanolamine, hydroxides of the alkali metals such as lithium hydroxide, sodium hydroxide and potassium hydroxide and organic acids.

The characteristic feature of the ink jet recording method of the present invention is to use the above ink of the present invention in an ink jet recording method performed by applying energy to the ink to fly the ink. As for the energy, thermal energy and mechanical energy can be used, but using thermal energy is preferable.

Although the recording materials are not limited in the ink jet recording method of the present invention, so-called inkjet paper, postcard or business card paper, label paper, corrugated paper boards, inkjet films, various copying papers, etc. are preferably used. As recording materials having a coating layer, recording materials having a coating layer which receives ink on at least one surface containing at least a hydrophilic polymer and/or inorganic porous bodies are desirable.

Examples of the ink jet recording apparatus which performs recording with an ink of the present invention mentioned above include home printers mainly using A4 sized paper, printers for business cards and various cards and large size printers for business use, and an example of a preferable ink jet recording apparatus is described below.

(Ink Jet Recording Apparatus Using Thermal Energy)

Figure 1:
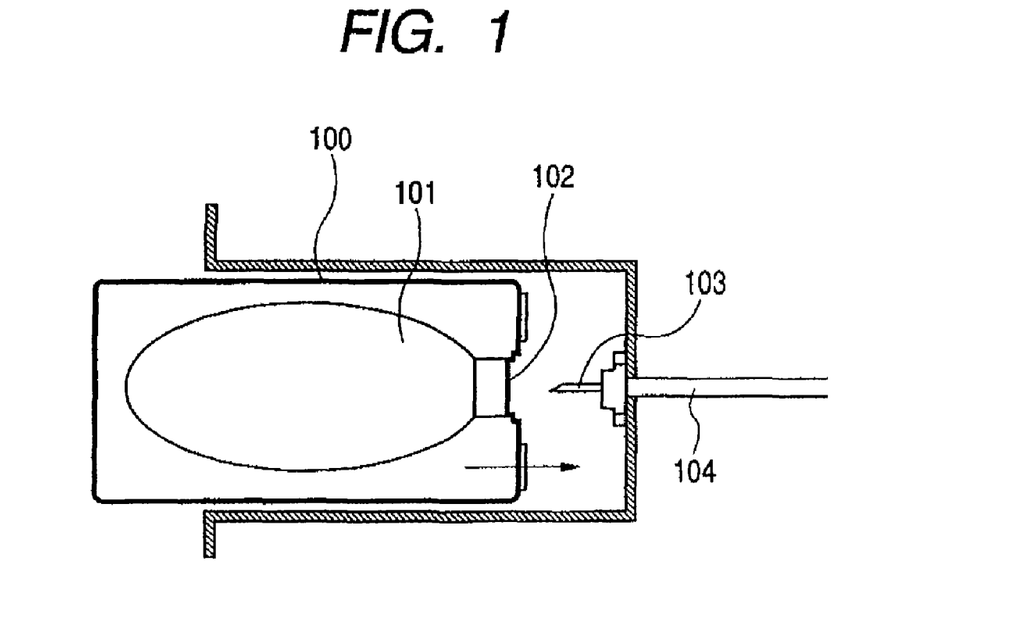
FIG. 1 is a schematic view to illustrate the structure of an ink cartridge.

FIG. 1 is a drawing illustrating an example of an ink cartridge 100 containing ink to be supplied to a head through an ink supply tube 104. Reference numeral 101 denotes an ink bag containing ink to be supplied, and a stopper 102 made of chlorinated butyl rubber is provided on the tip thereof. The ink in the ink bag 101 can be supplied to recording heads (303 to 306) by inserting a needle 103 in this stopper 102. An ink absorber which receives waste ink may be provided in an ink cartridge. As ink jet recording apparatuses used in the present invention, not only apparatuses in which the recording head and the ink cartridge are separately provided but also apparatuses in which the recording head and the ink cartridge are integrally provided are preferably used.

Figure 2:
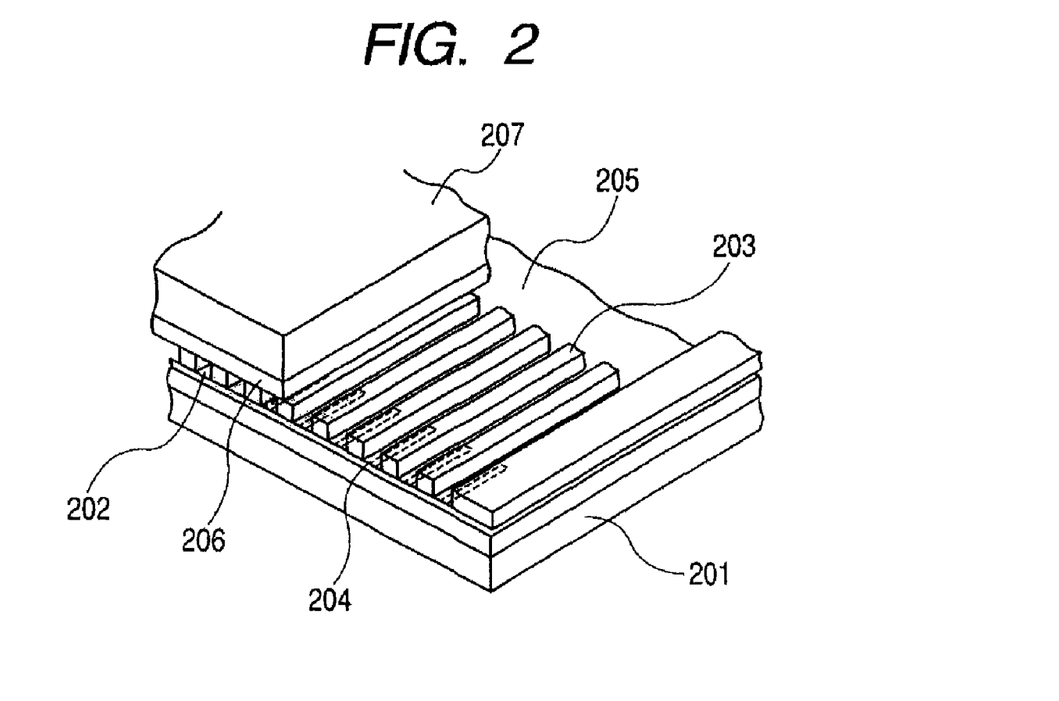
FIG. 2 is a schematic view to illustrate the structure of an ink jet recording head.

FIG. 2 is a schematic view illustrating the structure of the ink jet recording head used in the examples. A heat generating body 204 (heater) is provided corresponding to each nozzle 202. A predetermined drive pulse is applied to the heater 204 from a recording head drive circuit for heating to generate an air bubble, by the action of which an ink droplet is ejected from an ejection orifice 202. Here, the heater 204 is formed on a silicon substrate 206 by a technique similarly to a semiconductor manufacturing process. Reference numeral 201 denotes a baseplate, and reference numeral 203 is a nozzle partition constituting each nozzle 202, and reference numeral 205 is a common liquid chamber to supply ink to each nozzle 202, and reference numeral 207 is a top plate.

Figure 3:
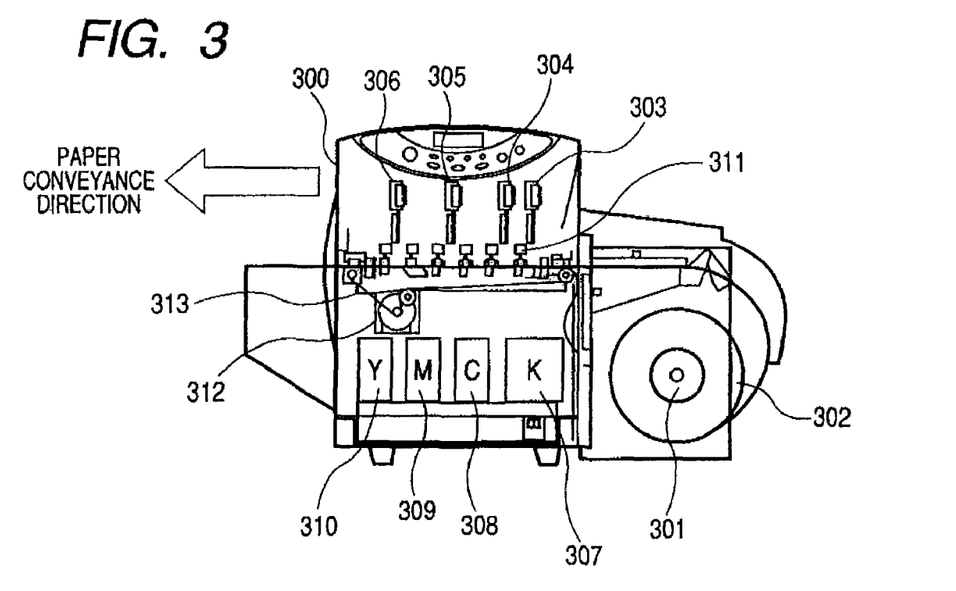
FIG. 3 is a perspective view of an ink jet recording apparatus.

A partial perspective view of the recording apparatus according to the present embodiment is shown in FIG. 3. A recording paper 302 of a recording apparatus 300 is, for example, supplied from a roll supply unit 301, and continually conveyed by a conveyance unit equipped in the main body of the recording apparatus 300. The conveyance unit comprises a conveyance motor 312, a conveyance belt 313, and so on. As for the recording, when an image cutting position of the recording paper passes under a black recording head 303, ejection of black ink is started from the recording head, and similarly the inks of each color are selectively ejected in the order of cyan 304, magenta 305 and yellow 306 to form a color image.

The recording apparatus 300 also comprises a cap mechanism 311 for capping each recording head during a waiting time, ink cartridges 307, 308, 309 and 310 for supplying ink to respective recording heads 303 to 306, a pump unit (not illustrated) for supplying the ink and performing recovery operation and control boards (not illustrated) for controlling the whole recording apparatus.

Figure 4:
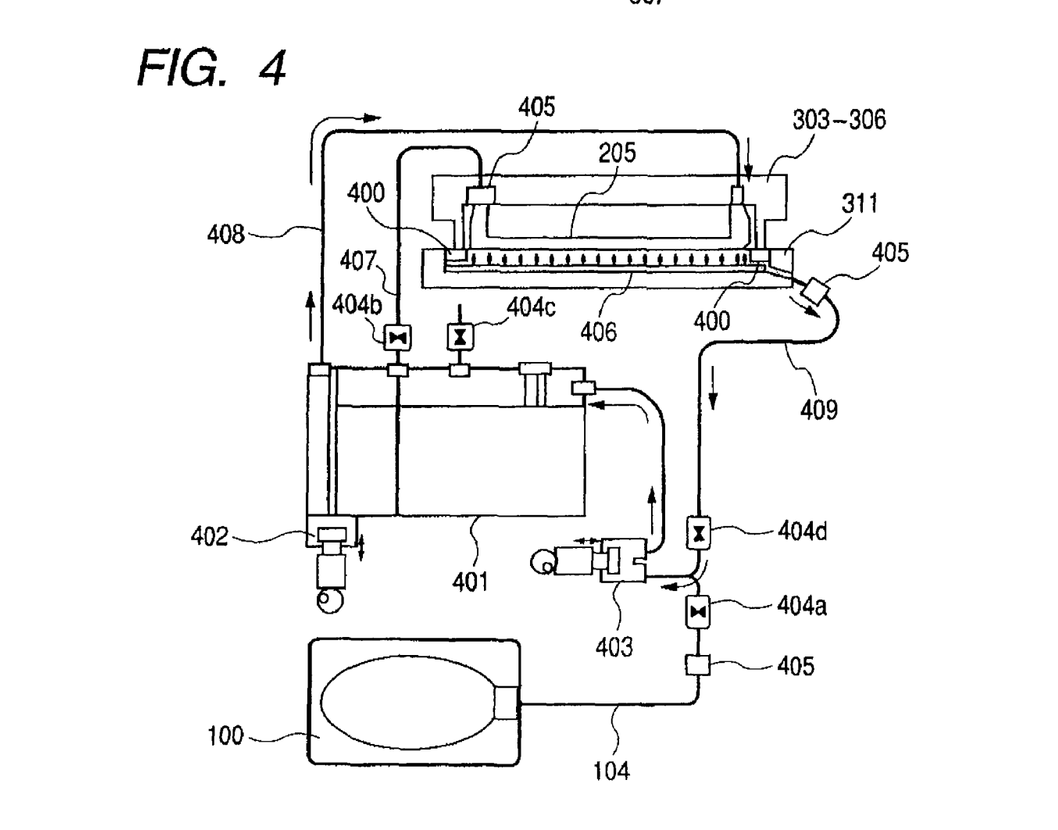
FIG. 4 is an outline view of a recovering system in an ink jet recording apparatus.

FIG. 4 is an outline view of the recovering system in the ink jet recording apparatus used in the examples. When the recording heads 303 to 306 fall, the ink ejecting surface comes close to a cap 400 formed of a chlorinated butyl rubber in the cap mechanism 311, and thereby enabling a predetermined recovering processing.

The ink recycling circuit portion in the recovery processing system comprises, as main components, an ink cartridge 100 in which ink to be supplied is stored and contained in a polyethylene bag, a subtank 401 connected through a suction pump 403 and so on, the suction pump 403 which is disposed in an ink feed passage 409 formed of vinyl chloride and connecting the cap 400 and the subtank 401 and collects the ink from the cap mechanism 311 to the subtank 401, a filter 405 which removes dust and the like from the ink which has been collected from the cap, a pressurizing pump 402 which is connected through the ink feed passage 408 and supplies ink into a common liquid chamber for recording heads 303 to 306, an ink feed passage 407 for feeding ink which comes back from the recording heads to the subtank 401 and valves 404a, 404b, 404c and 404d.

At the time of cleaning of recording heads 303 to 306, the recovery valve 404b is closed and the pressurizing pump 402 is operated to pressurize and supply ink from the subtank 401 to recording heads and to perform compulsory drainage from a nozzle 406. Bubbles, ink, dust and the like in the nozzle of the recording heads are thereby discharged. The suction pump 403 collects the ink, which has been drained from the recording heads to the cap mechanism 311, into the subtank 401.

(Ink Jet Recording Apparatus Using Mechanical Energy)

Next, a preferable example of an ink jet recording apparatus using mechanical energy is an on-demand ink jet recording head which comprises a nozzle formation board having a plurality of nozzles, a pressure generating element comprised of a piezoelectric material disposed to face the nozzles and an electrically conductive material, and ink filling the surroundings of the pressure generating element, displaces the pressure generating element by an applied voltage, and ejects minute ink droplets from the nozzle. An example of the constitution of the recording head which is a main part of the recording apparatus is illustrated in FIG. 5.

The head comprises an ink passage 80 which communicates with an ink chamber (not illustrated), an orifice plate 81 for ejecting ink droplets of a desired volume, a vibration board 82 which directly applies pressure to the ink, a piezoelectric element 83 which is attached to the vibration board 82 and displaced by electrical signals, and a board 84 for supporting and immobilizing the orifice plate 81, vibration board 82, and so on.

Figure 5:
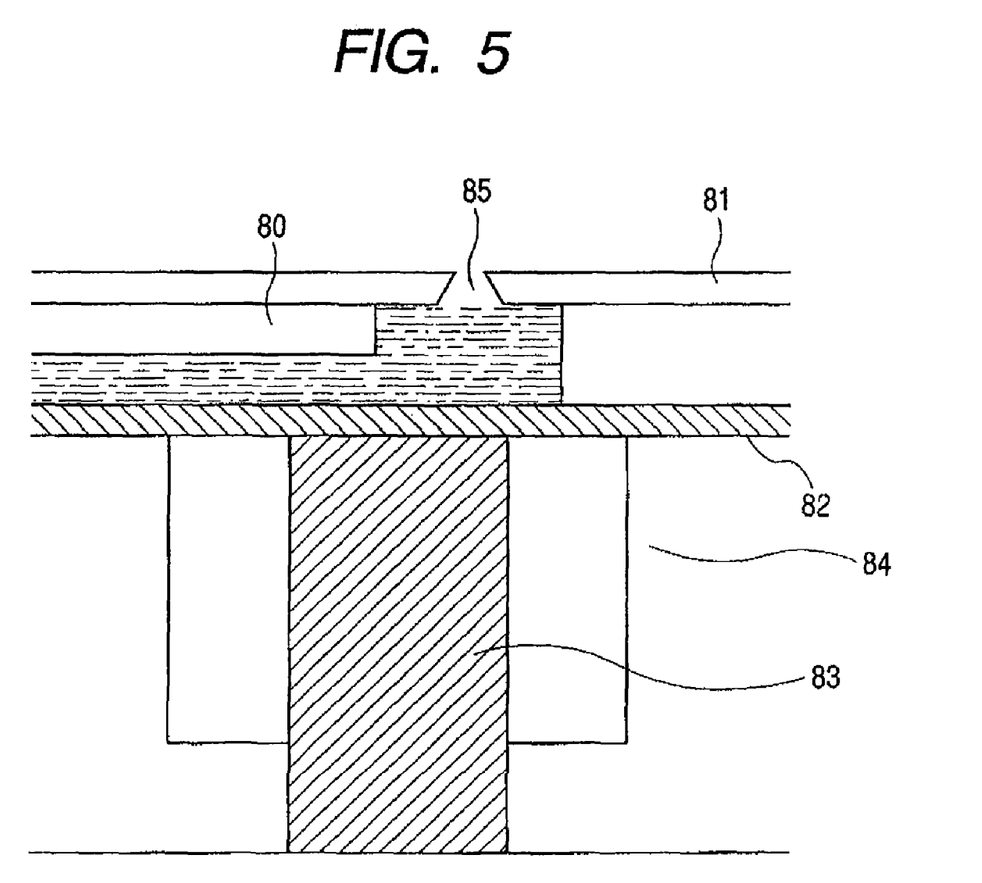
FIG. 5 is a schematic sectional view illustrating another constitution example of an ink jet recording head.

In FIG. 5, the ink passage 80 is formed of a photosensitive resin or the like, an ejection orifice 85 is formed in the orifice plate 81 by subjecting a metal such as stainless steel, nickel to electroforming or perforation by press working, the vibration board 82 is formed of a metal film such as stainless steel, nickel and titanium, highly elastic resin films and the like, and the piezoelectric element 83 is formed of dielectric materials such as barium titanate and PZT. The recording head of the constitution as mentioned above operates so that a pulsatile voltage is applied to the piezoelectric element 83 to generate a straining stress, and the energy transforms the vibration board 82 attached to the piezoelectric element 83, and pressurizes perpendicularly the ink within the ink passage 80 and ejects ink droplets (not illustrated) from the ejection orifice 85 of the orifice plate 81 to conduct recording.

EXAMPLES

In the following, the present invention is described based on the examples and comparative examples in detail. The present invention is not limited to these examples. In addition, "part" and "%" in the description are based on mass unless stated otherwise.

For identification of the polymer dispersant, nuclear magnetic resonance measurement apparatuses ($H^1$-NMR, ECA400 manufactured by JEOL Corporation, solvent: tetrahydrofuran-d8) and GPC (HLC8220 manufactured by Tosoh Corp., column: TSK-GEL4000HXL, TSK-GEL3000HXL, TSK-GEL2000HXL, column oven temperature; 40.0° C.).

(Preparation of Polymer Dispersant A)

A four-necked glass flask equipped with a condenser, a dropping funnel, a thermometer and a stirrer was subjected to nitrogen replacement and then charged with 100 parts of dimethylformamide and 0.5 part of pentamethyldiethylenetriamine, and subsequently 36 mmol of 1-methyl-4-vinylbenzene as a hydrophobic monomer of the hydrophobic unit and 1 mmol of chloroethyl benzene as an initiator were added thereto and heated while stirring. When the temperature in the system reached 80° C., 0.2 part of copper(I) chloride was added thereto to start polymerization and a block portion comprised of the hydrophobic monomers of the hydrophobic unit (Component A) was synthesized. The molecular weight was periodically monitored using molecular sieve column chromatography (GPC), and after the polymerization of the Component A was completed, 36 mmol of N-(2-(2-hydroxyethoxy)ethyl)acrylamide (Component B) was subsequently added as a hydrophilic monomer which forms the acrylamide structure of the above-mentioned general formula (1) and polymerization was continued. The molecular weight was monitored similarly by GPC, and after the polymerization of the Component B was completed, 20 mmol of butyl methacrylate for which the carboxyl group of methacrylic acid has been esterified with a butyl group (Component C) was added as a monomer capable of forming a segment having an anionic hydrophilic group to perform synthesis. After the polymerization was terminated, the esterified carboxyl group was hydrolyzed with a sodium-hydroxide/methanol solution to convert the carboxyl group to the carboxylic acid type, thereby obtaining an ABC triblock copolymer (Polymer dispersant A). The identification of the polymer dispersant was performed by using NMR and GPC (Mw=$1.1 \times 10^4$, Mw/Mn=1.2). When the acid value of the obtained polymer dispersant was measured, it was 80 mgKOH/g.

(Preparation of Polymer Dispersants B to G)

Polymer dispersants B to G described in Table 1 (Tables 1-1 and 1-3) were prepared in the same manner as in Polymer dispersant A except that the kind and added amount of the monomers of the hydrophobic unit and the hydrophilic unit were changed. Polymer dispersants E and F were synthesized by mixing and then adding Monomer B and Monomer C, and Polymer dispersant G was synthesized without adding Monomer C.

(Preparation of Polymer Dispersant H)

A four-necked glass flask equipped with a condenser, a dropping funnel, a thermometer and a stirrer was subjected to nitrogen replacement and then charged with 100 parts of dimethylformamide and 40 mmol of butyl 4-vinyl-benzoate as a hydrophobic monomer of the hydrophobic unit and 1 mmol of azobisisobutyronitrile as an initiator were added thereto and heated while stirring so that the system temperature reached 70° C. The molecular weight was periodically monitored using nuclear magnetic resonance (NMR), and after 60% or more of the hydrophobic monomer was polymerized, 36 mmol of N-(2-(2-hydroxyethoxy)ethyl)acrylamide (Component B) as a hydrophilic monomer which forms the acrylamide structure of the above general formula (1) and 20 mmol of methacrylic acid (Component C) as a monomer capable of forming a segment having an anionic hydrophilic group were subsequently added and synthesis was performed to obtain an ABC copolymer (Polymer dispersant H). The identification of the polymer dispersant was performed by using NMR and GPC. When the acid value of the obtained polymer dispersant was measured, it was 80 mgKOH/g. It was confirmed that the obtained polymer dispersant has a structure having a block portion of hydrophobic monomer A and a random portion of the hydrophobic monomer and the hydrophilic monomer (random portion of ABC).

(Preparation of Polymer Dispersants I to L)

Polymer dispersants I to L described in Table 1 (Tables 1-2 and 1-3) were prepared in the same manner as in Polymer dispersant H except that the kind and added amount of the monomers of the hydrophobic unit and the hydrophilic unit were changed.

TABLE 1-1

| Polymer dispersant | Hydrophobic unit Monomer A | Segment number of block portion of Monomer A | Hydrophilic unit Monomer B | Monomer C | Segment number of block portion of Monomer A/Segment number of Monomer B | Segment number of block portion of Monomer A/Total segment number of polymer dispersant | Order of block portions |
|---|---|---|---|---|---|---|---|
| A | 1-methyl-4-vinylbenzene | 36 | N-(2-(2-hydroxyethoxy)ethyl)acrylamide | Methacrylic acid | 1 | 0.41 | A-B-C |
| B | Butyl 4-vinyl benzoate | 20 | N-(methoxyethyl)acrylamide | Acrylic acid | 5 | 0.75 | A-B-C |
| C | 1-Butyl-4-(propen-2-yl)benzene | 100 | N-(2-hydroxyethyl)acrylamide | Methacrylic acid | 2 | 0.49 | A-B-C |
| D | 1-Methyl-4-vinylbenzene | 10 | N-(2-hydroxyethyl)acrylamide | Maleic acid | 0.5 | 0.24 | A-B-C |
| E | 4-Methoxy-vinylbenzene | 150 | N-(2-(2-ethoxyethoxy)ethyl)acrylamide | Acrylic acid | 5 | 0.81 | A-(BC) A: block; BC: random |
| F | 4-Methoxy-vinylbenzene | 200 | N-(2-(2-ethoxyethoxy)ethyl)acrylamide | Styrenecarboxylic acid | 10 | 0.84 | A-(BC) A: block; BC: random |
| G | Octadecyl 4-vinyl benzoate | 10 | N-(2-(2-ethoxyethoxy)ethyl)acrylamide | — | 0.1 | 0.09 | A-B |

*For Polymer dispersants A to G, Monomer C was added after the carboxylic acid group thereof was esterified and polymerization was performed

TABLE 1-2

| Polymer dispersant | Hydrophobic unit Monomer A | Segment number of block portion of Monomer A | Hydrophilic unit Monomer B | Monomer C | Segment number of block portion of Monomer A/Segment number of Monomer B | Segment number of block portion of Monomer A/Total segment number of polymer dispersant | Order of block portions |
|---|---|---|---|---|---|---|---|
| H | Butyl 4-vinyl benzoate | 36 | N-(2-(2-hydroxyethoxy)-ethyl)acrylamide | Methacrylic acid | 5 | 0.54 | A-(ABC)[Note 1] |
| I | Butyl 4-vinyl benzoate | 28 | N-(2-(2-hydroxyethoxy)-ethyl)acrylamide | Methacrylic acid | 5 | 0.42 | A-(ABC)[Note 2] |

TABLE 1-2-continued

| Polymer dispersant | Hydrophobic unit | | Hydrophilic unit | | Segment number of block portion of Monomer A/Segment number of Monomer B | Segment number of block portion of Monomer A/Total segment number of polymer dispersant | Order of block portions |
|---|---|---|---|---|---|---|---|
| | Monomer A | Segment number of block portion of Monomer A | Monomer B | Monomer C | | | |
| J | Butyl 4-vinyl benzoate | 20 | N-(2-(2-hydroxyethoxy)-ethyl)acrylamide | Methacrylic acid | 5 | 0.28 | A-(ABC)$^{Note\ 3}$ |
| K | 1-Methyl-4-vinylbenzene | 10 | N-(2-hydroxyethyl)acrylamide | Methacrylic acid | 0.1 | 0.07 | A-(ABC)$^{Note\ 4}$ |
| L | Butyl 4-vinyl benzoate | 100 | N-(methoxyethyl)acrylamide | Acrylic acid | 20 | 0.60 | A-(ABC)$^{Note\ 5}$ |

Note 1 Formed of block portion of A and random portion of ABC (segment number of A: 4)
Note 2 Formed of block portion of A and random portion of ABC (segment number of A: 8)
Note 3 Formed of block portion of A and random portion of ABC (segment number of A: 6)
Note 4 Formed of block portion of A and random portion of ABC (segment number of A: 2)
Note 5 Formed of block portion of A and random portion of ABC (segment number of A: 12)

TABLE 1-3

| Polymer dispersant | Molecular weight Mw | Molecular weight distribution Mw/Mn | Acid value mgKOH/g |
|---|---|---|---|
| A | $1.1 \times 10^4$ | 1.2 | 80 |
| B | $5.2 \times 10^3$ | 1.1 | 30 |
| C | $3.0 \times 10^4$ | 1.1 | 100 |
| D | $3.5 \times 10^3$ | 1.2 | 145 |
| E | $2.7 \times 10^4$ | 1.4 | 10 |
| F | $4.9 \times 10^4$ | 1.4 | 20 |
| G | $2.3 \times 10^4$ | 1.3 | — |
| H | $1.3 \times 10^4$ | 1.8 | 80 |
| I | $1.1 \times 10^4$ | 1.9 | 100 |
| J | $1.1 \times 10^4$ | 1.9 | 150 |
| K | $1.2 \times 10^4$ | 1.8 | 150 |
| L | $4.8 \times 10^4$ | 1.9 | 70 |

Example 1

(Preparation of Pigment Dispersion Liquid 1)

A methyl ethyl ketone solution of Polymer dispersant A above and carbon black (MA100 manufactured by Mitsubishi Chemical Corp.) as a commercial pigment were charged into an extruder having a twin screw and kneaded until the mixture became homogeneous. Then the solvent was evaporated by depressurization while maintaining the inner temperature at 80° C. The kneaded product was made into a sheet using two rolls, and a predetermined amount of ion-exchange water and sodium hydroxide as a neutralizer in an amount corresponding to 1 equivalent of the anionic group of the polymer dispersant were added thereto to obtain Pigment dispersion liquid 1 having a pigment concentration of 15% and a polymer dispersant concentration of 10%.

Example 2

(Preparation of Pigment Dispersion Liquid 2)

Pigment dispersion liquid 2 having a pigment concentration of 15% and a polymer dispersant concentration of 10% was obtained in the same way as in Example 1 except that the polymer dispersant of Example 1 was changed to Polymer dispersant B, and the pigment to C.I. Pigment Blue 15:3.

Example 3

(Preparation of Pigment Dispersion Liquid 3)

Pigment dispersion liquid 3 having a pigment concentration of 15% and a polymer dispersant concentration of 10% was obtained in the same way as in Example 1 except that the polymer dispersant of Example 1 was changed to Polymer dispersant C, and the pigment to C.I. Pigment Yellow 128.

Example 4

(Preparation of Pigment Dispersion Liquid 4)

Pigment dispersion liquid 4 having a pigment concentration of 15% and a polymer dispersant concentration of 10% was obtained in the same way as in Example 1 except that the polymer dispersant of Example 1 was changed to Polymer dispersant D, and the pigment to C.I. Pigment Red 122.

Example 5

(Preparation of Pigment Dispersion Liquid 5)

Pigment dispersion liquid 5 having a pigment concentration of 1% and a polymer dispersant concentration of 2% was obtained in the same way as in Example 1 except that the polymer dispersant of Example 1 was changed to Polymer dispersant E, and the pigment to C.I. Pigment Yellow 74.

Example 6

(Preparation of Pigment Dispersion Liquid 6)

Pigment dispersion liquid 6 having a pigment concentration of 30% and a polymer dispersant concentration of 3% was obtained in the same way as in Example 1 except that the polymer dispersant of Example 1 was changed to Polymer dispersant F, and the pigment to C.I. Pigment Violet 19.

Example 7

(Preparation of Pigment Dispersion Liquid 7)

Pigment dispersion liquid 7 having a pigment concentration of 0.5% and a polymer dispersant concentration of 1.5% was obtained in the same way as in Example 1 except that the polymer dispersant of Example 1 was changed to Polymer dispersant G, and the pigment to C.I. Pigment Blue 16.

Example 8

(Preparation of Pigment Dispersion Liquid 8)

Pigment dispersion liquid 8 having a pigment concentration of 15% and a polymer dispersant concentration of 10% was obtained in the same way as in Example 1 except that the polymer dispersant of Example 1 was changed to Polymer dispersant H.

Example 9

(Preparation of Pigment Dispersion Liquid 9)

Pigment dispersion liquid 9 having a pigment concentration of 15% and a polymer dispersant concentration of 10% was obtained in the same way as in Example 1 except that the polymer dispersant of Example 1 was changed to Polymer dispersant I.

Example 10

(Preparation of Pigment Dispersion Liquid 10)

Pigment dispersion liquid 10 having a pigment concentration of 15% and a polymer dispersant concentration of 10% was obtained in the same way as in Example 1 except that the polymer dispersant of Example 1 was changed to Polymer dispersant J.

Example 11

(Preparation of Pigment Dispersion Liquid 11)

Pigment dispersion liquid 11 having a pigment concentration of 15% and a polymer dispersant concentration of 10% was obtained in the same way as in Example 1 except that the polymer dispersant of Example 1 was changed to Polymer dispersant K.

Example 12

(Preparation of Pigment Dispersion Liquid 12)

Pigment dispersion liquid 12 having a pigment concentration of 15% and a polymer dispersant concentration of 10% was obtained in the same way as in Example 1 except that the polymer dispersant of Example 1 was changed to Polymer dispersant L.

Comparative Example 1

(Preparation of Pigment Dispersion Liquid 13)

Pigment dispersion liquid 13 having a pigment concentration of 15% and a polymer dispersant concentration of 10% was obtained using the same carbon black as used in Example 1 in the same way as in Example 1 except that as a polymer dispersant, styrene-2-hydroxypropyl acrylate-acrylic acid random copolymer (number average molecular weight: 8,000, acid value: 8 mgKOH/g, number of the styrene segments/total number of all segments=0.94, number of the styrene segments/number of the segments of 2-hydroxypropyl acrylate=22) was used.

Comparative Example 2

(Preparation of Pigment Dispersion Liquid 14)

Pigment dispersion liquid 14 having a pigment concentration of 15% and a polymer dispersant concentration of 10% was obtained using the same carbon black as used in Example 1 in the same way as in Example 1 except that as a polymer dispersant, hexadecyl methacrylate-N,N-dimethylacrylamide-methacrylic acid block copolymer (number average molecular weight: 25,000, acid value: 160 mgKOH/g, number of the hexadecyl methacrylate segments/total number of all segments=0.05, number of the hexadecyl methacrylate segments/number of the segments of N,N-dimethylacrylamide=0.08) was used.

Comparative Example 3

(Preparation of Pigment Dispersion Liquid 15)

Pigment dispersion liquid 15 having a pigment concentration of 15% and a polymer dispersant concentration of 10% was obtained using the same carbon black as used in Example 1 in the same way as in Example 1 except that polyoxyethylene hexadecyl ether (HLB: 12.9) as a dispersant was used.

(Preparation of Polymer Dispersants M to N)

Polymer dispersants M to N described in Table 2 (Tables 2-1 and 2-2) were prepared in the same manner as in Polymer dispersant H except that the kind and added amount of the monomers of the hydrophobic unit and the hydrophilic unit were changed.

TABLE 2-1

| Polymer dispersant | Hydrophobic unit Monomer A | Segment number of block portion of Monomer A | Hydrophilic unit Monomer B | Monomer C | Segment number of block portion of Monomer A/Segment number of Monomer B | Segment number of block portion of Monomer A/Total segment number of polymer dispersant | Order of block portions |
|---|---|---|---|---|---|---|---|
| M | 1-methyl-4-vinylbenzene | 10 | N-(2-hydroxyethyl) acrylamide | Methacrylic acid | 0.05 | 0.03 | A-(ABC)[Note 1] |
| N | 1-methyl-4-vinylbenzene | 200 | N-(2-hydroxyethyl) acrylamide | Methacrylic acid | 25 | 0.92 | A-(ABC)[Note 2] |

[Note 1] Formed of block portion of A and random portion of ABC (segment number of A; 2)

[Note 2] Formed of block portion of A and random portion of ABC (segment number of A; 25)

TABLE 2-2

| Polymer dispersant | Molecular weight Mw | Molecular weight distribution Mw/Mn | Acid value mgKOH/g |
|---|---|---|---|
| M | $2.4 \times 10^4$ | 1.9 | 200 |
| N | $3.8 \times 10^4$ | 1.8 | 15 |

Comparative Example 4

(Preparation of Pigment Dispersion Liquid 16)
Pigment dispersion liquid 16 having a pigment concentration of 15% and a polymer dispersant concentration of 10% was obtained in the same way as in Example 1 except that the polymer dispersant of Example 1 was changed to Polymer dispersant M.

Comparative Example 5

(Preparation of Pigment Dispersion Liquid 17)
Pigment dispersion liquid 17 having a pigment concentration of 15% and a polymer dispersant concentration of 10% was obtained in the same way as in Example 1 except that the polymer dispersant of Example 1 was changed to Polymer dispersant N.
(Evaluation 1)
Pigment dispersion liquids of Examples 1 to 5 and 8 to 12 and Comparative Examples 1 to 5 were used and the following ingredients were mixed therewith and stirred enough to prepare respective inks.

| | |
|---|---|
| Pigment dispersion liquid | 30.0 parts |
| Triethylene glycol | 10.0 parts |
| Tripropylene glycol | 10.0 parts |
| Ion-exchange water | 50.0 parts |

Pigment dispersion liquid of Example 6 was used and the following ingredients were mixed therewith and stirred enough to prepare an ink.

| | |
|---|---|
| Pigment dispersion liquid | 30.0 parts |
| Glycerin | 10.0 parts |
| Ethylene glycol | 20.0 parts |
| Ion-exchange water | 40.0 parts |

Pigment dispersion liquid of Example 7 was used and the following ingredients were mixed therewith and stirred enough to prepare an ink.

| | |
|---|---|
| Pigment dispersion liquid | 40.0 parts |
| Diethylene glycol | 10.0 parts |
| 1,2-butanediol | 5.0 parts |
| Polyethylene glycol 600 | 5.0 parts |
| 2-Pyrrolidone | 5.0 parts |
| Ion-exchange water | 35.0 parts |

Tests on dispersion stability of the pigment dispersion liquids of Examples 1 to 12 and Comparative Examples 1 to 5, and ejection stability, image quality of the printed images, fastness and storage stability of the ink using the pigment dispersion liquids of Examples 1 to 12 and Comparative Examples 1 to 5 were performed. As for the image quality, fastness and ejection stability, respective inks were set to an ink jet recording apparatus P-660CII (manufactured by CANON FINETECH Inc.) which had an on-demand type multi-recording heads which eject ink by applying to the ink thermal energy corresponding to record signals, and printing was performed on plain paper GF-500 (manufactured by CANON Inc.) and evaluated. As a result, as shown in Table 3, the pigment dispersion liquids of any Examples are superior to the pigment dispersion liquids of Comparative Examples in dispersion stability. In addition, inks using a pigment dispersion liquid of Examples were superior to inks using a pigment dispersion liquid of Comparative Examples in storage stability and ejection stability, and good results were obtained with regard to image quality and fastness.

TABLE 3

| | Dispersion stability[*1] | Intermittent ejection stability[*2] | Continuous ejection stability[*3] | Image quality[*4] | Fastness[*5] | Storage stability[*6] |
|---|---|---|---|---|---|---|
| Example 1 | AA | AA | AA | AA | AA | AA |
| Example 2 | AA | AA | AA | AA | AA | AA |
| Example 3 | AA | AA | AA | AA | AA | AA |
| Example 4 | AA | AA | AA | AA | AA | AA |
| Example 5 | A | AA | A | AA | AA | A |
| Example 6 | A | AA | A | AA | AA | A |
| Example 7 | A | A | A | A | A | A |
| Example 8 | AA | A | AA | AA | AA | A |
| Example 9 | AA | A | AA | A | AA | A |
| Example 10 | A | A | AA | A | AA | A |
| Example 11 | A | A | A | A | A | A |
| Example 12 | A | A | AA | A | A | A |
| Comparative Example 1 | C | B | B | B | B | C |
| Comparative Example 2 | A | B | B | B | B | A |
| Comparative Example 3 | C | C | C | C | C | C |
| Comparative Example 4 | B | B | B | B | B | B |
| Comparative Example 5 | A | A | A | B | B | B |

1: Dispersion Stability

After respective pigment dispersion liquids were stored in a sealed state at 80° C. for two weeks, the particle size before and after the test was measured. The increase ratio of the particle size (%) was calculated from the following expression and taken as an index of dispersion stability. Dynamic light scattering method (product name; Laser particle size analysis system FPAR-1000 manufactured by Otsuka Elecroics, Co., Ltd.) was used for the measurement of the particle size. Criterion for evaluation was as follows.

Increase ratio of particle size (%)=(Particle size after test−Particle size before test)/Particle size after test×100

AA: Increase ratio of the particle size (%) is less than 5%.
A: Increase ratio of the particle size (%) is 5% or more and less than 10%.
B: Increase ratio of the particle size (%) is 10% or more and less than 30%.
C: Increase ratio of the particle size (%) is 30% or more.

2: Intermittent Ejection Stability

After respective inks were stored at 70° C. for two weeks, 100% solid image was printed under an environment of 10% humidity at 15° C., and after a three minute pause, 100% solid image was printed again and evaluated according to the following criterion.

AA: Normally printed without any white stripe.
A: White stripe is slightly observed at the initial part of the printing.
B: White stripe is observed over the whole image.
C: The image is scarcely printed.

3: Continuous Ejection Stability 1,000 pieces of a gradation pattern of a postcard size were printed continuously, and the ejection characteristics of print dot misalignment of the image and ejection failure were evaluated according to the following criterion at the 1000th piece.

AA: Normally printed without any print dot misalignment or ejection failure.
A: No ejection failure occurs but print dot misalignment is partially observed.
B: Ejection failure partially occurs and print dot misalignment is observed over the whole image.
C: Ejection failure frequently occurs and print dot misalignment is observed over the whole image.

4: Image Quality

An image was printed with respective inks stored at 70° C. for two weeks, and the printed image was evaluated according to the following criterion.

AA: There is no bleeding of the image and chroma is high.
A: There is no bleeding of the image but chroma is slightly low.
B: Slight bleeding is observed.
C: Bleeding frequently occurs and chroma is low.

5: Fastness

100% solid image was printed with respective inks stored at 70° C. for two weeks, and the printed image was rubbed with a lens-cleaning paper under a load of $2\times10^4$ N/m² one minute after printing and evaluated according to the following criterion.

AA: There is no friction mark in the image and no adhesion to the lens-cleaning paper.
A: There is no friction mark in the image but adhesion to the lens-cleaning paper is observed.
B: Some friction marks in the image are observed.
C: There are a number of friction marks in the image.

6: Storage Stability

After respective inks were stored in a sealed state at 70° C. for two weeks, the particle size before and after the test was measured. The increase ratio of the particle size (%) was calculated from the following expression and taken as an index of storage stability. Dynamic light scattering method (product name; Laser particle size analysis system FPAR-1000 manufactured by Otsuka Elecroics, Co., Ltd.) was used for the measurement of the particle size. Criterion for evaluation was as follows.

Increase ratio of particle size s(%)=(Particle size after test−Particle size before test)/Particle size after test×100

AA: Increase ratio of the particle size (%) is less than 5%.
A: Increase ratio of the particle size (%) is 5% or more and less than 10%.
B: Increase ratio of the particle size (%) is 10% or more and less than 30%.
C: Increase ratio of the particle size (%) is 30% or more.

INDUSTRIAL APPLICABILITY

As described above, according to the present invention, a pigment dispersion liquid which gives an ink capable of stably recording images having high fastness and excellent quality for a long term in any cases can be provided; and besides an ink, an ink jet recording method and an ink jet recording apparatus which is able to record images having excellent fastness and quality can be provided.

While the invention has been described with reference to the preferred embodiments disclosed herein, it is not confined to the details set forth and this application is intended to cover such modifications or changes as may come within the purpose of the improvements or the scope of the appended claims.

This application claims the benefit of Japanese Patent Application No. 2007-331402, filed Dec. 25, 2007, which is hereby incorporated by reference herein in its entirety.

What is claimed is:

1. A pigment dispersion liquid mainly comprising a polymer dispersant, a pigment and water, wherein the polymer dispersant is a copolymer comprised of at least a hydrophobic unit and a hydrophilic unit, the hydrophobic unit has a block portion comprised of at least one hydrophobic monomer, the hydrophilic unit has at least a repeating unit structure of an acrylamide structure of the following general formula (1), and wherein the segment number (A) of the block portion comprised of a hydrophobic monomer to the number (B) of all segments of the polymer dispersant is in a range of 0.07 to 0.85 in terms of A/B ratio:

General formula (1)

wherein, R¹ represents a hydrogen atom or a methyl group, X represents a hydrogen atom or an alkyl group having 1 to 4 carbon atoms and n is 1 to 10.

2. The pigment dispersion liquid according to claim 1, wherein the block portion comprised of a hydrophobic monomer in the hydrophobic unit is a block portion comprised of a repeating unit structure of the following general formula (2):

General formula (2)

wherein, $R^2$ represents a hydrogen atom or a methyl group and Y represents —$R^3$, —$OR^3$ or —$COOR^3$ where $R^3$ represents an alkyl group having 1 to 18 carbon atoms.

3. The pigment dispersion liquid according to claim 1, wherein the hydrophilic unit has a segment having an anionic hydrophilic group.

4. The pigment dispersion liquid according to claim 3, wherein the hydrophilic unit has a block portion comprised of a repeating unit structure of the general formula (1) and a block portion comprised of a segment having an anionic hydrophilic group.

5. The pigment dispersion liquid according to claim 4, wherein the polymer dispersant is comprised of at least a block portion comprised of a repeating unit structure of the general formula (2), a block portion comprised of a repeating unit structure of the general formula (1) and a block portion comprised of a segment having an anionic hydrophilic group in the stated order.

6. The pigment dispersion liquid according to claim 1, wherein the segment number (A) of the block portion comprised of a hydrophobic monomer of the polymer dispersant to the segment number (C) of the general formula (1) of the polymer dispersant is in a range of 0.1 to 20 in terms of A/C ratio.

7. An ink jet recording ink prepared by mixing a pigment dispersion liquid as set forth in claim 1 and at least a water-soluble organic solvent.

8. An ink jet recording method comprising causing an ink to fly by applying energy to the ink to apply the ink to a recording material, wherein the ink is an ink jet recording ink according to claim 7.

9. The ink jet recording method according to claim 8, wherein the energy is a thermal energy.

10. An ink cartridge having an ink storage portion containing an ink, wherein the ink is an ink jet recording ink according to claim 7.

11. An ink jet recording apparatus having an ink cartridge having an ink storage portion containing an ink and a head portion for ejecting the ink, wherein the ink is an ink jet recording ink according to claim 7.

* * * * *